United States Patent [19]

Bagwell

[11] Patent Number: 5,076,154
[45] Date of Patent: Dec. 31, 1991

[54] GAS GRILL APPARATUS

[76] Inventor: J. Jewell Bagwell, 103 Hicks Rd., Greenville, S.C. 29605

[21] Appl. No.: 686,848

[22] Filed: Apr. 17, 1991

Related U.S. Application Data

[63] Continuation of Ser. No. 494,821, Mar. 15, 1990, abandoned, which is a continuation of Ser. No. 284,834, Dec. 13, 1988, abandoned, which is a continuation of Ser. No. 77,816, Jul. 27, 1987, abandoned.

[51] Int. Cl.$^5$ .............................................. A47J 27/00
[52] U.S. Cl. ........................................ 99/446; 99/444
[58] Field of Search .................... 99/444, 445, 446; 126/41 R, 25 R

[56] References Cited

U.S. PATENT DOCUMENTS

| 1,057,449 | 4/1913 | Noreck | 99/446 |
| 3,092,015 | 6/1963 | Tucker et al. | 99/446 |
| 3,130,662 | 4/1964 | Robinson | 99/446 |
| 3,443,510 | 5/1969 | Norton | 99/446 |
| 3,989,028 | 11/1976 | Berger | 99/446 |

FOREIGN PATENT DOCUMENTS

| 129109 | 9/1948 | Australia | 99/445 |
| 2156201 | 10/1985 | United Kingdom | 99/446 |

Primary Examiner—Linda J. Sholl
Attorney, Agent, or Firm—Bailey & Hardaway

[57] ABSTRACT

A lava rock tray with caps over heat passageways and a grease diverter prevent grease from falling into the bottom of a grill and into a gas-fueled flame.

1 Claim, 2 Drawing Sheets

GAS GRILL APPARATUS

This application is a continuation of application Ser. No. 07/494,821, filed Mar. 15, 1990, which is a continuation of 07/284,834, filed Dec. 13, 1988, which is a continuation of 07/077,816, filed Jul. 27, 1987, all now abandoned.

BACKGROUND OF THE INVENTION

This invention relates generally to the art of cooking grills and more particularly to an improvement in a gas grill which prevents flare up.

Numerous gas grills have been provided with a lower rack of perforated ceramic material for charcoal or other lava rock. However, the necessary gaps in the racks or trays for allowing heat passage from the lower gas-fueled flame have also served to allow grease and food particles to drop into the bottom of the grill and into the gas-fueled flame causing flare-up and requiring constant cleaning of the bottom of the grill and the gas burner.

SUMMARY OF THE INVENTION

It is thus an object of this invention to provide a lava rock tray for a gas grill into which grease falling from a cooking rack is diverted.

It is a further object of this invention to prevent any grease from falling into the bottom of the grill housing and into the gas-fueled flame.

It is a further and more particular object of this invention to avoid flare-up and dispense with burdensome clean-up of the bottom of the grill and of the gas burner.

These as well as other objects are accomplished by providing a tray with spaced compartments for holding lava rock and capping the gaps between said compartments.

DETAILED DESCRIPTION

Figure 1:
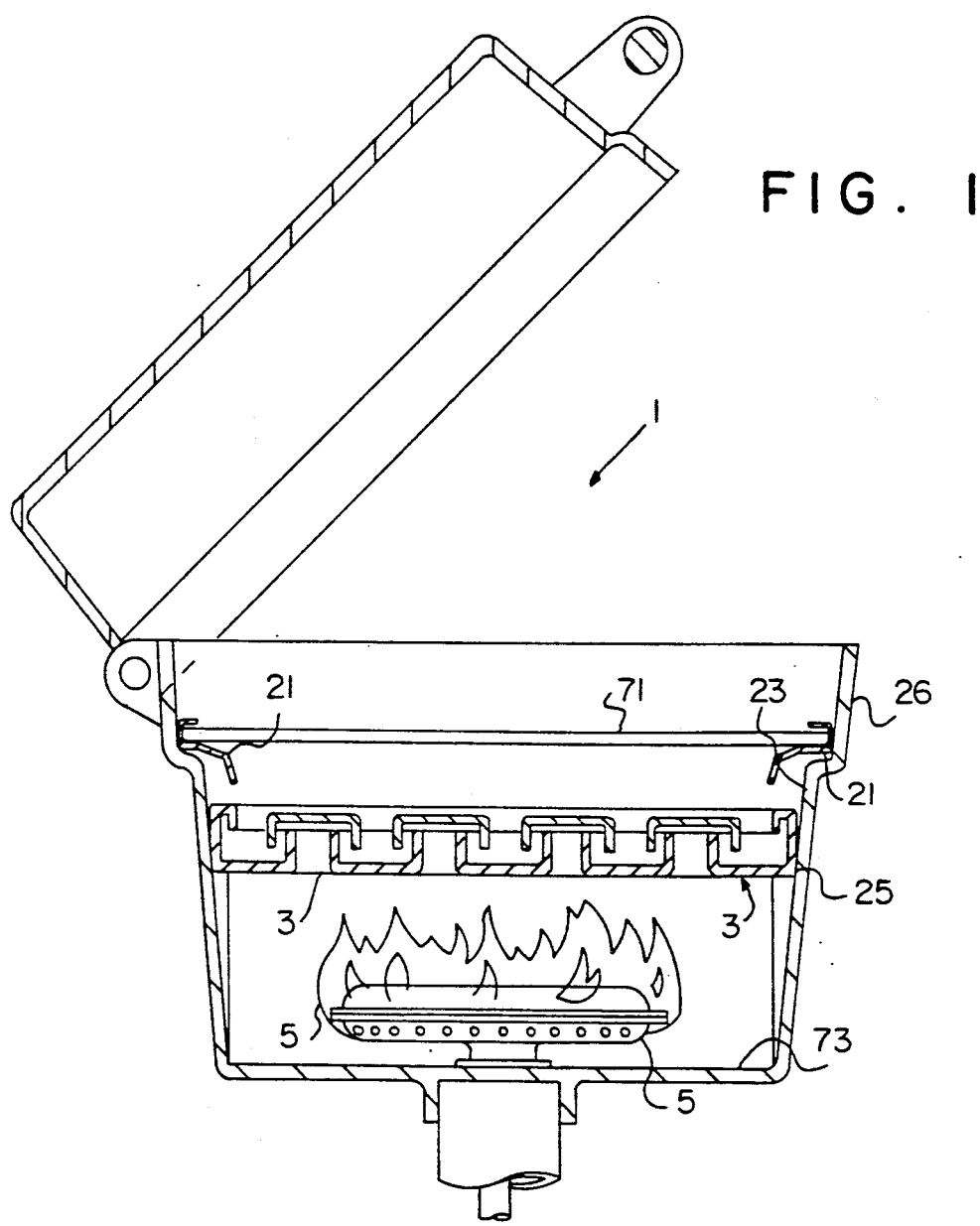
FIG. 1 of the drawings is a cross section view of one embodiment of a lava rock tray and grease diverter in accordance with this invention.

In accordance with this invention it has been found that grease may be prevented from dropping into the bottom of a gas grill, and therefore, from dropping into a gas-fueled flame, by placing caps over all means of heat passage from the gas-fueled flame through a lava rock tray and by diverting any grease which might otherwise roll along the inner wall of the grill housing into the bottom of the housing. The caps over the heat passageway are shaped to prevent grease from dropping through the heat passageway into the gas-fueled flame below and to direct the grease into the lava rock tray. While the term lava rock tray is used throughout the disclosure, it is to be understood that the gas grill will function without lava rock and that the lava rock tray in that case, will still serve to divert grease and food particles from the gas flame. Various advantages and features of this invention will become apparent from the following description given with reference to the various figures of the drawing.

Figure 2:
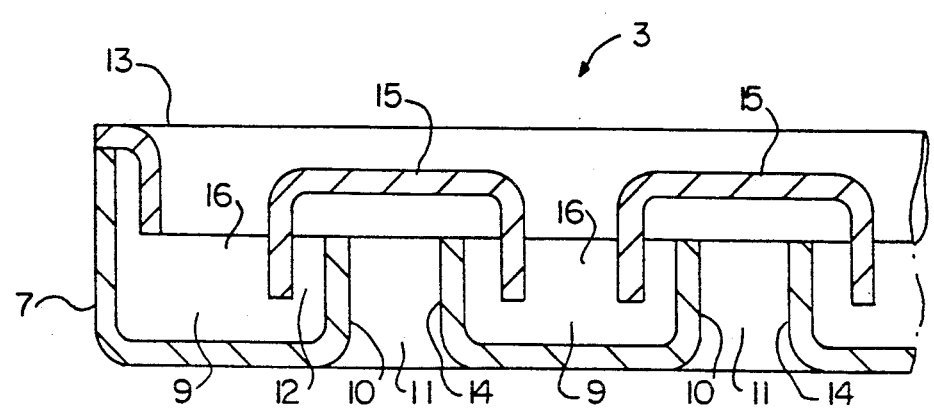
FIG. 2 of the drawings is a breakaway view of a portion of the lava rock tray of FIG. 1.

FIG. 1 illustrates in cross section a gas grill 1 having a lava rock tray 3 positioned above a gas-fueled flame 5. Lava rock will generally be placed on top of tray 3. FIG. 2 is an enlarged breakaway view of a portion of FIG. 1 illustrating in greatest detail lava rock tray 3. A lower unit, or portion 7 of lava rock tray 3 is comprised of spaced compartments 9. Heat from the gas-fueled flame below passes through the gaps 11 defined between the compartments 9 bordered by respective sidewalls 10 and 14.

A removable top unit, or portion 13 is comprised of caps 15 which fit over the gaps 11 defined between compartments 9 and vertically overlaps sidewalls 10 and 14 of the bottom portion 7 preventing grease from dropping through the gaps 11 while permitting gaseous communication through space 12 defined when the top portion 13 is lowered over the bottom portion 7.

Figure 3:
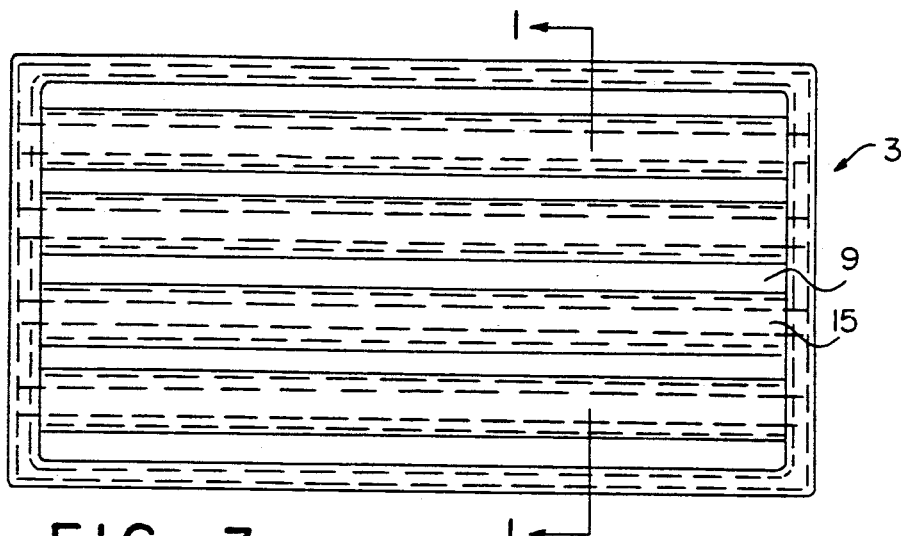
FIG. 3 of the drawings is a top view of the lava rock tray of FIG. 1.

FIG. 3 is a plan view of FIG. 1 illustrating the lava rock tray 3 with the caps 15 illustrated. The middle portion of each compartment 9 is visible from the top while the flame 5 and gaps 11 are not visible.

Figure 4:
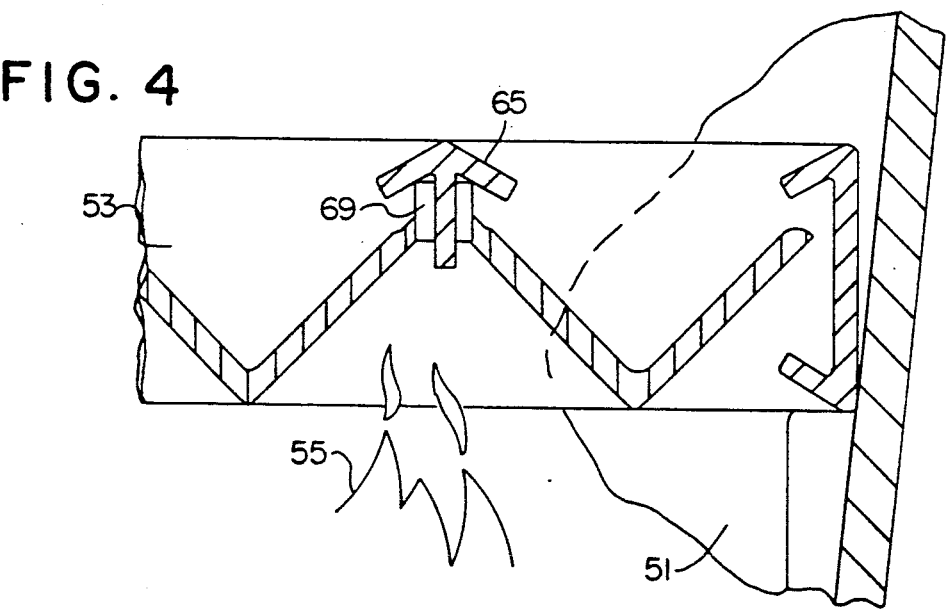
FIG. 4 of the drawings is a cutaway view of the positioning of another embodiment of the lava rock tray in accordance with this invention.

FIG. 4 illustrates another embodiment of a gas grill 51 in accordance with this invention. A lava rock tray 53 is of unitary construction with caps 65 supported over the gaps 69. As in the above described variation, these caps 65 prevent grease from dropping through the gaps 69 into the flame 55 below yet allow heat to pass up through the gaps 69.

Figure 5:
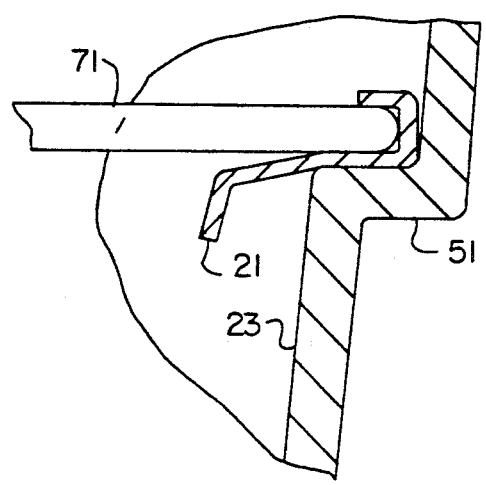
FIG. 5 of the drawings is a top view of the lava rock tray of FIG. 4.

FIG. 5 illustrates the structure of grease diverter 21 which is positioned along the edge of the cooking surface of both embodiments. Protruding down from the edge of the cooking rack 71, as illustrated in FIG. 1, the grease diverter 21 catches grease that would otherwise roll along the inner wall of the grill housing 23 and pass through the crevice 25 formed by the lava rock tray resting against the inner wall of the housing 26, later to roll to the bottom 73 of the grill 1 to cause flare-up. The grease diverter 21 instead sends the grease into the lava rock tray 3.

It is thus apparent that the invention disclosed herein provides a means for preventing grease and food particles from falling into the bottom of a grill and into the gas-fueled flame at the bottom of said grill. As many variations will be apparent from a reading of the above description, such variations are embodied within the spirit and scope of this invention as defined by the following appended claims.

What is claimed is:

1. A gas grill comprising:
   a housing;
   a gas supply;
   a burner in communication with said gas supply, said burner being within said housing;
   a horizontal tray above said burner;
   said tray including a top portion unit and a bottom portion unit, said tray removable as a whole from said grill and said top portion unit removable from said bottom portion unit, said tray and said top and bottom portion units thereby being easily removed for cleaning, said bottom portion unit further having spaced generally U-shaped compartments and arranged so as to be capable of maintaining a liquid within the U-shaped thereof;

said spaced compartments having gaps between adjacent U-shaped compartments, said top portion unit comprising a plurality of caps, each said cap overlying a gap between adjacent U-shaped sections and being also generally U-shaped but inverted from the direction of the U-shaped of the bottom portion so as to overlie a gap and interleave with the adjacent U-shaped members of the bottom portion unit;

a cooking surface above said tray, said cooking surface having edges;

diverting plates positioned adjacent to and extending along said edges of said cooking surface, said diverting plates being simultaneously positioned adjacent to said housing, and said diverting plates protruding down from said edges of said cooking surface to vertically overlap said tray; and said tray arranged to provide gaseous communication between said burner and said cooking surface, said gaseous communication having a path which is circuitous and non-linear whereby flames from said burner do not contact said cooking surface and grease drippings from said cooking surface do not contact the flames of said burner.

* * * * *